United States Patent
Okuda et al.

(10) Patent No.: US 7,034,952 B2
(45) Date of Patent: Apr. 25, 2006

(54) PRINT SERVICE SYSTEM AND METHOD FOR PRINTING DESIGNATED ELECTRONIC DOCUMENT IN RESPONSE TO PRINT REQUEST

(75) Inventors: Koichi Okuda, Yokohama (JP); Tomohiko Sasatani, Yokohama (JP); Naoyuki Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 917 days.

(21) Appl. No.: 09/836,288

(22) Filed: Apr. 18, 2001

(65) Prior Publication Data

US 2002/0001099 A1    Jan. 3, 2002

(30) Foreign Application Priority Data

Apr. 20, 2000  (JP) .............................. 2000-120120
Apr. 20, 2000  (JP) .............................. 2000-120122

(51) Int. Cl.
*G06F 15/00* (2006.01)

(52) U.S. Cl. ................... 358/1.15; 358/1.13; 358/1.14; 358/1.16; 358/1.18; 709/223; 709/227; 705/34; 713/155

(58) Field of Classification Search ............... 358/1.15, 358/1.18, 1.14; 713/155; 705/34, 26; 396/429; 235/379; 399/79; 347/43
See application file for complete search history.

(56) References Cited

U.S. PATENT DOCUMENTS

| | | | | |
|---|---|---|---|---|
| 5,956,698 | A * | 9/1999 | Lacheze et al. | 705/34 |
| 6,292,267 | B1 * | 9/2001 | Mori et al. | 358/1.15 |
| 6,327,049 | B1 * | 12/2001 | Ohtsuka | 358/1.18 |
| 6,378,070 | B1 * | 4/2002 | Chan et al. | 713/155 |
| 6,457,640 | B1 * | 10/2002 | Ramachandran et al. | 235/379 |
| 6,629,753 | B1 * | 10/2003 | Usui | 347/43 |
| 6,738,155 | B1 * | 5/2004 | Rosenlund et al. | 358/1.15 |
| 6,801,731 | B1 * | 10/2004 | Parker | 399/79 |
| 6,882,439 | B1 * | 4/2005 | Ishijima | 358/1.15 |
| 2001/0016829 | A1 * | 8/2001 | Toshikage et al. | 705/26 |
| 2003/0026612 | A1 * | 2/2003 | Ohta | 396/429 |

\* cited by examiner

*Primary Examiner*—Kimberly Williams
*Assistant Examiner*—Satwant Singh
(74) *Attorney, Agent, or Firm*—Fitzpatrick, Cella, Harper & Scinto

(57) ABSTRACT

A print service system capable of improving user settlement convenience by setting a charging system depending upon each service type and dynamically determining a fee depending upon the past use records of a user to provide services specific to each user.

60 Claims, 21 Drawing Sheets

FIG. 10

| USER ID | DATE OF USE | FEE (¥) |
|---|---|---|
| Okuda | 2000/03/01 | 450 |
| Okuda | 2000/03/11 | 500 |
| Okuda | 2000/03/24 | 1,500 |
| Yamada | 2000/03/02 | 5,700 |
| Yamada | 2000/03/24 | 6,400 |

FIG. 11

| USER ID | USE RECORDS FOR MARCH (¥) | DISCOUNT (%) | TERM OF SETTLEMENT (DAYS) | CREDIT ACCEPTED UP TO (¥) |
|---|---|---|---|---|
| Okuda | 0 | 0 | 0 | 0 |
| Yamada | 0 | 0 | 0 | 0 |
| Inoue | 0 | 0 | 0 | 0 |

FIG. 12

| USE RECORDS FOR LAST MONTH (¥) | BASIC DISCOUNT (%) | TERM OF SETTLEMENT (DAYS) | CREDIT ACCEPTED UP TO (¥) |
|---|---|---|---|
| 0~999 | 0 | 0 | 0 |
| 1,000~9,999 | 1 | 1 | 1,000 |
| 10,000~99,999 | 5 | 7 | 10,000 |
| 100,000~ | 10 | 14 | 50,000 |

FIG. 13

| USER ID | USE RECORDS FOR MARCH (¥) | DISCOUNT (%) | TERM OF SETTLEMENT (DAYS) | CREDIT ACCEPTED UP TO (¥) |
|---|---|---|---|---|
| Okuda | 2,450 | 1 | 1 | 1,000 |
| Yamada | 12,100 | 5 | 7 | 10,000 |
| Inoue | 0 | 0 | 0 | 0 |

FIG. 16

| SHOP ID | DATE OF USE | FEE (¥) |
|---|---|---|
| 0001 | 2000/03/03 | 87,000 |
| 0001 | 2000/03/16 | 128,070 |
| 0001 | 2000/03/29 | 112,400 |
| 0002 | 2000/03/08 | 25,700 |
| 0002 | 2000/03/22 | 46,400 |

FIG. 17

| SHOP ID | TOTAL RECORDS (¥) | ROYALTY (%) |
|---|---|---|
| 0001 | 158,000 | 4.5 |
| 0002 | 64,850 | 10.0 |

FIG. 18

| TOTAL RECORDS (¥) | ROYALTY (%) |
|---|---|
| 0~100,000 | 10.0 |
| 100,001~500,000 | 4.5 |
| 500,001~1,000,000 | 2.0 |
| 1,000,000~ | 0.7 |

FIG. 19

| SHOP ID | TOTAL RECORDS (¥) | ROYALTY (%) |
|---|---|---|
| 0001 | 485,470 | 4.5 |
| 0002 | 136,950 | 4.5 |

FIG. 22

| SHOP ID | LOCATION ID | STATUS | TIME SERVICE | | |
|---|---|---|---|---|---|
| | | | TIME | MEAN USE TIMES | DISCOUNT (%) |
| 0001 | 0723 | OPERATING JOB(S) UNPROCESSED : 0 | EARLY MORNING | 54 | 20 |
| | | | DAY | 257 | 0 |
| | | | NIGHT | 25 | 10 |
| | | | MIDNIGHT | 18 | 30 |
| 0002 | 1134 | OPERATING JOB(S) UNPROCESSED : 3 | EARLY MORNING | 14 | 30 |
| | | | DAY | 130 | 10 |
| | | | NIGHT | 144 | 10 |
| | | | MIDNIGHT | 20 | 20 |
| 0003 | 9654 | OUT OF ORDER | EARLY MORNING | 0 | 50 |
| | | | DAY | 570 | 0 |
| | | | NIGHT | 45 | 20 |
| | | | MIDNIGHT | 1 | 50 |

FIG. 26

| USER ID | DATE & TIME OF USE | TYPE OF SERVICE | MONO/COLOR | PAPER SIZE/ BINDING | NO. OF PRINTS |
|---|---|---|---|---|---|
| Okuda | 2000/04/01 MIDNIGHT | DIRECT | MONOCHROME | A4 | 10 |
| Okuda | 2000/04/02 DAY | REMOTE | MONOCHROME | A4 | 5 |
| Yamada | 2000/04/01 NIGHT | REMOTE | COLOR | B4 | 20 |

FIG. 27

| | DIRECT (¥) | | REMOTE (¥) | | STANDARD COPY (¥) | |
|---|---|---|---|---|---|---|
| | MONO | COLOR | MONO | COLOR | MONO | COLOR |
| A3 1 PRINT | 18 | 70 | 30 | 90 | 20 | 80 |
| A4 1 PRINT | 9 | 40 | 15 | 60 | 10 | 50 |
| B4 1 PRINT | 9 | 40 | 15 | 60 | 10 | 50 |
| B5 1 PRINT | 9 | 40 | 15 | 60 | 10 | 50 |
| BINDING | 400 | B5 | 600 | 800 | 500 | 700 |

PRINT SERVICE SYSTEM AND METHOD FOR PRINTING DESIGNATED ELECTRONIC DOCUMENT IN RESPONSE TO PRINT REQUEST

BACKGROUND OF THE INVENTION

1. Field of the Invention

The present invention relates to a print service system for providing print services at a print service shop having an output apparatus such as a printer, in response to a user request.

2. Related Background Art

When a user prints electronic image/document at a print service shop having an output apparatus such as a printer, the user supplies a storage medium storing electronic data or connects a user terminal such as a personal computer to the output apparatus, to print the electronic data stored in the storage medium or in the user terminal.

A user may connect a user terminal at an office or home to a print server via a network such as the ISDN network to transmit electronic image/document via the print server to a print service shop to print out the electronic data.

SUMMARY OF THE INVENTION

As compared to direct printing by connecting a user terminal to a printer at a print service shop, indirect printing via a print server requires an additional communication fee for transmitting electronic document data from the user terminal to the server and to the print service shop.

If the charging system uses always both a printer use fee and a communication fee irrespective of service types, a user is required to make a settlement by paying both the fees, which is not convenient for the user to use the system.

The invention has been made to solve such conventional technical problems and aims to provide a print service system capable of improving user settlement convenience by setting a charging system depending upon each service type.

With a conventional print service system, a fee per one copy is discounted depending upon the number of output copies, or discounted to a member fee for a registered user.

With this system, the fee is discounted simply depending upon the number of output copies or to the member fee, irrespective of how many times a user uses a printer. Therefore, a user who frequently uses a printer has no merit.

The invention has been made to solve such conventional technical problems and aims to provide a print service system capable of dynamically determining a fee depending upon the past use records of a user to provide services specific to each user.

BRIEF DESCRIPTION OF THE DRAWINGS

FIG. 10 is a diagram showing an example of the structure of log data including user use records.

FIG. 11 is a diagram showing an example of a service use record management table before being updated.

FIG. 12 is a diagram showing an example of a user charge management attribute reference table.

FIG. 13 is a diagram showing an example of a service use record management table after updated.

FIG. 16 is a diagram showing an example of the structure of log data including operation records at each print service shop.

FIG. 17 is a diagram showing an example of a printer use record management table for each print service shop before being updated.

FIG. 18 is a diagram showing an example of a contracted shop royalty reference table.

FIG. 19 is a diagram showing an example of a printer use record management table for each print service shop after updated.

FIG. 22 is a diagram showing an example of a shop information table.

FIG. 26 is a diagram showing an example of the structure of log data including user service use types.

FIG. 27 is a diagram showing an example of a service type standard unit fee.

DETAILED DESCRIPTION OF THE PREFERRED EMBODIMENTS

Embodiments of the invention will be described with reference to the accompanying drawings.

(Outline Structure of Print Service System)

Figure 1:
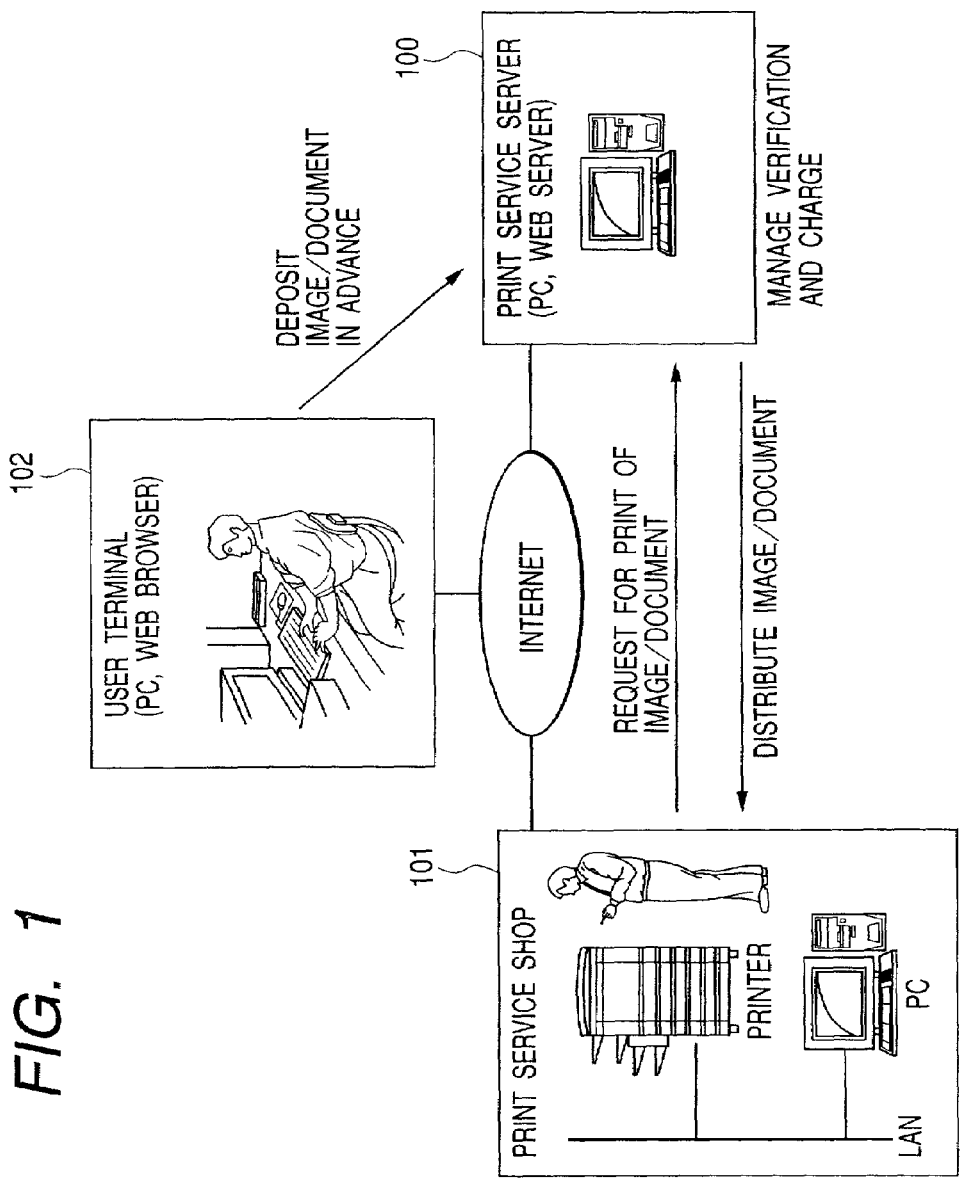
FIG. 1 is a diagram showing the outline structure of a first print service system according to an embodiment of the invention.
Figure 2:
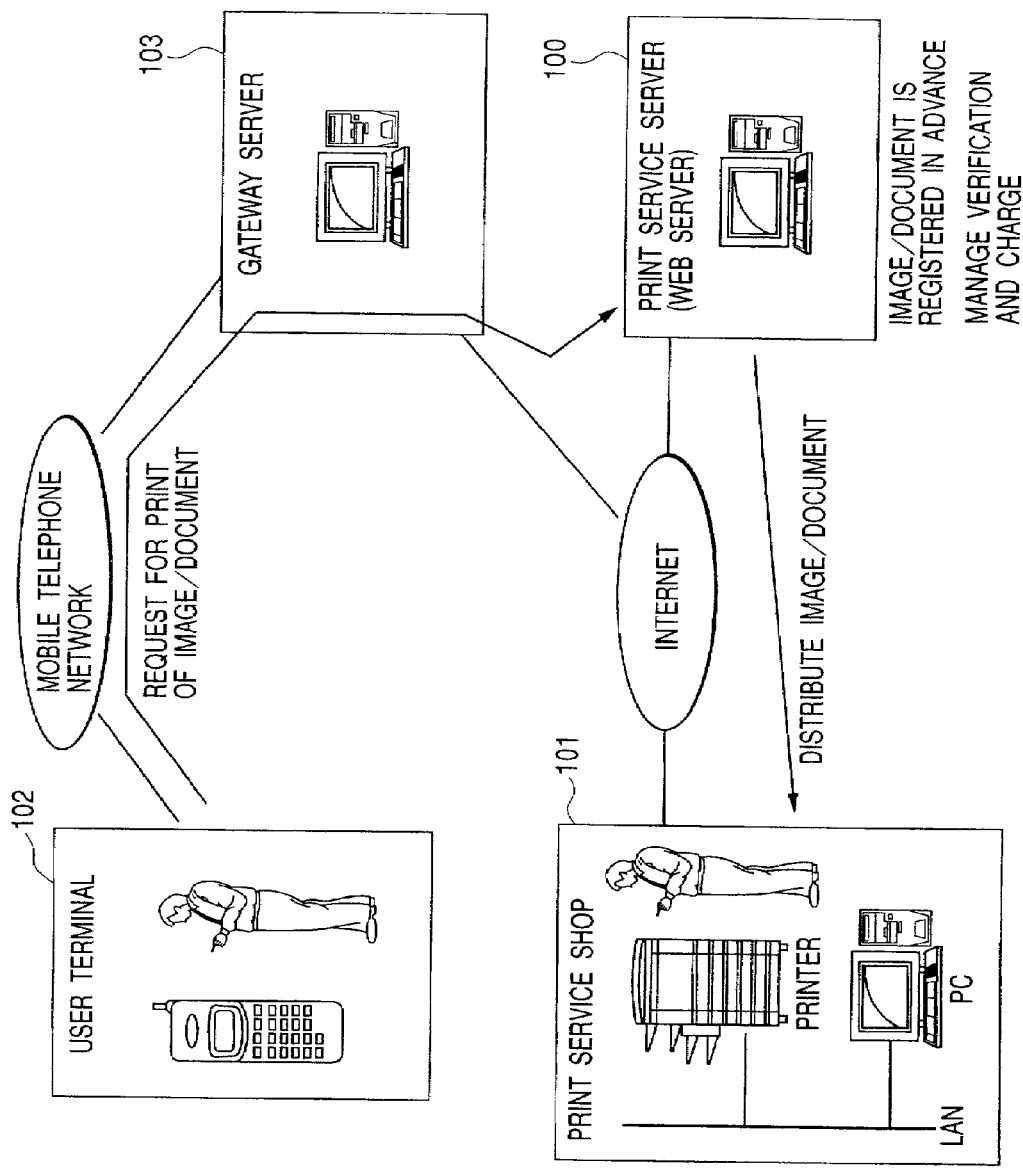
FIG. 2 is a diagram showing the outline structure of a second print service system according to an embodiment of the invention.
Figure 3:
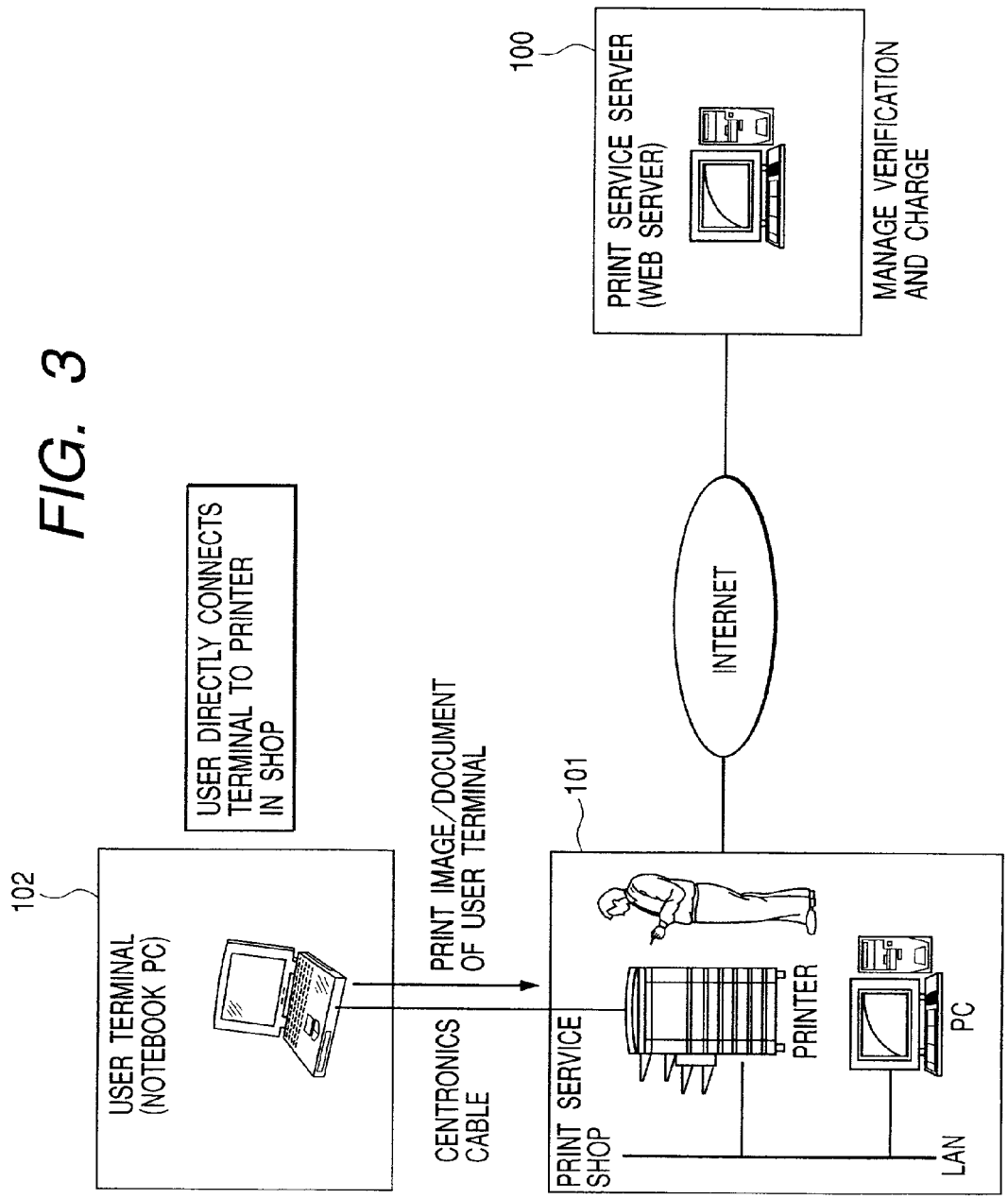
FIG. 3 is a diagram showing the outline structure of a third second print service system according to an embodiment of the invention.

FIGS. 1 to 3 are diagrams showing the outline structures of a print service system according to the embodiments.

Referring to FIG. 1, a print service server 100 is a personal computer (PC) or a Web server and manages the whole of print services. A user charge process and a service shop settlement process are managed as a general rule by the print service server 100.

A print service shop 101 has a printer 101a, a PC connected to the printer 101a via a LAN, and the like. The print service shop 101 provides users with print services.

A user terminal 102 may be a PC at a user office or home. It is desired that the user terminal 102 is connectable to the Internet via a telephone line or ISDN line and has a Web browser for analyzing an HTML document and displaying it on a display screen. A user accesses the print service system by using the user terminal 102.

In this example, although the system has one user terminal 102 and one print service shop 101, it is obvious that the system is applicable to a plurality of users and shops.

If a plurality of print service servers 100 are set and a means for transferring data between servers a is provided, the system performance can be improved and a system having higher reliability can be realized.

The operation type of each print service system shown in FIGS. 1 to 3 will be described.

In the system shown in FIG. 1, the user terminal 102, print service shop 101 and print service server 100 are interconnected by the same network. More specifically, they are connected to the Internet and a user accesses the print service server 100 and instructs the print service server 100 to print a designated document at the print service shop 101. The charge management is performed by the print service server 100.

In the system shown in FIG. 2, a mobile telephone is used as the user terminal 102 which is prevailing nowadays and has a function of a data terminal. The fundamental service type is similar to that of the system shown in FIG. 1. In this system, a user connects the user terminal 102 to a gateway server of a mobile telephone carrier via a mobile telephone network, and to the Internet via the gateway server. The gateway server can perform user verification, charge and the like.

In the system shown in FIG. 3, as a user terminal 102, a portable PC such as a so-called note type PC is used. A user directly connects the user terminal 102 to a system of the print service shop 101 via a Centronics cable or the like, and a printer 101a directly handles a print request from the user terminal 102. Also in this system, the charge management and the like for each user can be performed collectively at the print service server. In this case, the printer 101a or a PC connected to the printer 101a transfers charge information of each print request to the print service server 100.

In operating the system, an access means to the print service server 100 is installed basing upon mainly a general Internet protocol (HTTP or the like), and security is ensured by using a general means typically an SSL (Secure Socket Layer).

A connection means between the print service shop 101 and user terminal 102 is installed by using general parallel or serial connection.

Figure 4:
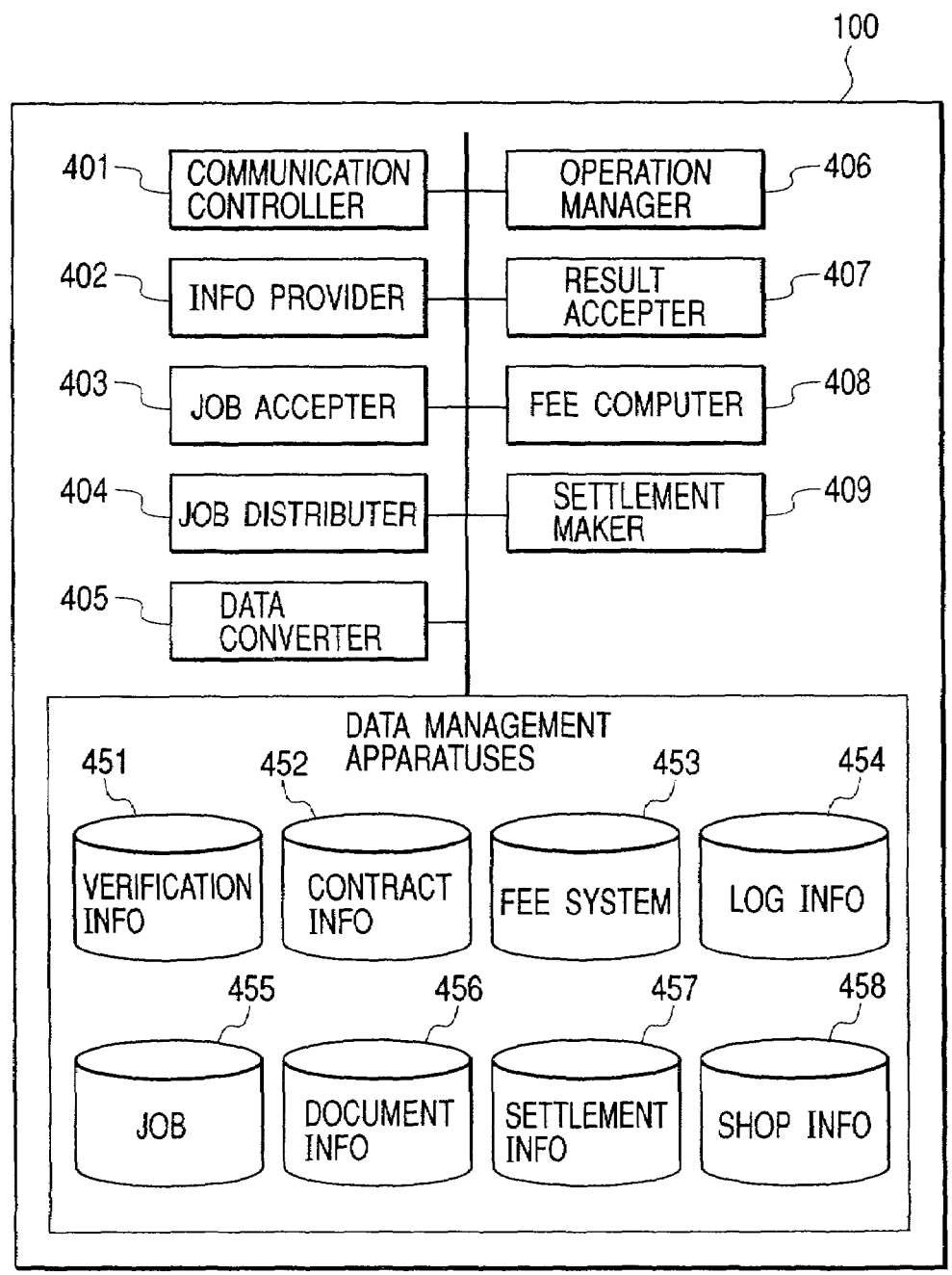
FIG. 4 is a block diagram showing the functions of a print service server.

FIG. 4 is a functional block diagram of the print service server 100 of the embodiments.

The print service server 100 is mainly constituted of: a communication controller 401; an information provider 402; a job accepter 403; a job distributer 404, a data converter 405; an operation manager 406; a result accepter 407; a fee computer 408; and a settlement maker 409, as well as a data management apparatus group comprising a verification information unit 451; a contract information unit 452; a fee system unit 453; a log information unit 454; a job unit 455; a document information unit 456; a settlement information unit 457; and a shop information unit 458. The print service server 100 constitutes a print service management server.

The communication controller 401 performs a data communication process for the user terminal 102, print service shop 101 and the like. A user verification process and the like are performed by using data managed by the verification information unit 451.

The information provider 402 searches requested data from various data managed by the server 100 and generates data to be sent back to the requester. The communication controller 401 and information provider 402 constitute a communication means.

The job accepter 403 accepts job data (mainly print request) from a user, the job data being managed by the job unit 455. The job accepter 403 also accepts a document registration request from a user, data regarding the document registration request being managed by the document information unit 456.

The job distributer 404 sequentially transfers job data still not processed and under management by the job unit 455 to the designated print service shop 101.

The data converter 405 performs a conversion process of converting, when necessary, the data format of job data or the like so as to match the print process performance of the print service shop 101 to which the job data is distributed.

The operation manager 406 performs registration, update and the like of user management data, shop management data, fee management data and the like necessary for providing and operating services for the data management apparatus group.

The result accepter 407 accepts a result of a job executed at the print service shop, and in accordance with the result contents, updates the job management data in the job unit 455 and resisters the log information in the log information unit 454.

The fee computer 408 computes a fee to be claimed to the job result in accordance with various charge conditions, settlement data being managed by the settlement information unit 457.

The settlement maker 409 performs a settlement process for a charge depending upon user use records, a pay settlement process and royalty settlement process for each print service shop, and the like.

The data management apparatus group operated and managed by the server will be described supplementarily. Each data management apparatus or unit is constituted of a storage unit such as HD.

The verification information unit 451 manages data to be managed under sufficient security, such as a password and a settlement account number corresponding to a user ID. For a user whose access is to be denied, such as a user without a contract period updating process and a user whose fee is not paid even after the due date, an attribute representative of an access denied user is also managed by the verification information unit 451.

The contract information unit 452 manages data including each contracted user attribute (user name, address, contact location or the like), contract contents (contract period), settlement means (credit card, bank transfer, or the like), discount rate depending upon use records and the like.

The fee system unit 453 manages a standard fee table for each service, a user charge management attribute reference table which is used as a calculation reference to various charge process services depending upon use records, a contracted shop royalty reference table which is used as a reference to royalty calculation of each contracted shop depending upon service records, and other tables.

The log information unit 454 sequentially records and manages as to who issued a lob to which shop and what was the result, and the like, respectively of each service.

The job unit 455 manages a job received from a user to sequentially perform a job process. The job unit 455 stores a priority degree of each job to perform job scheduling, accepts a job with a designated execution time, and stores job data to be later executed again.

The document information unit 456 can perform registration, management, search and the like of a document upon request from a user.

The settlement information unit 457 manages data for settlement of service execution including a settlement process state.

The shop information unit 458 manages various shop information.

Figure 5:
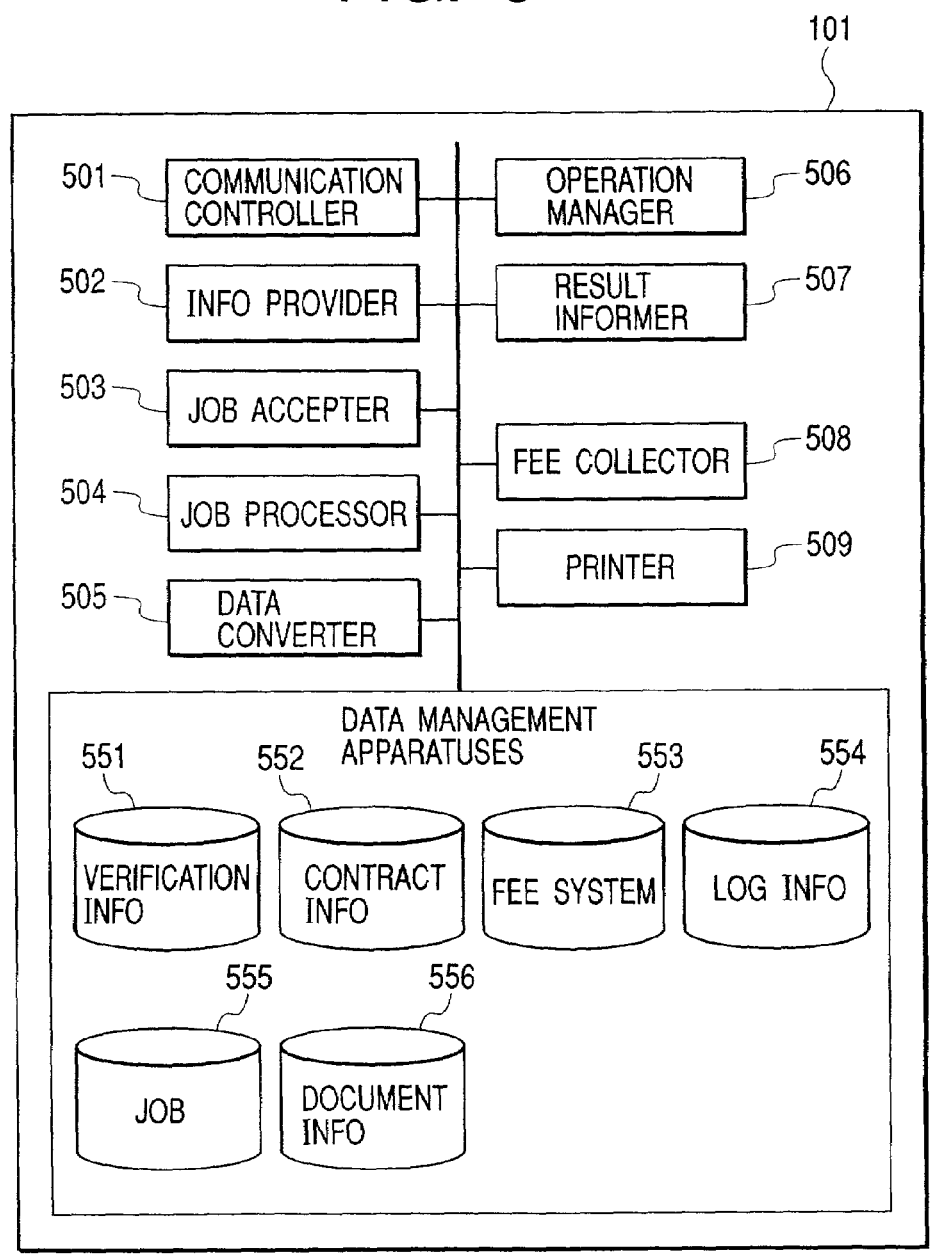
FIG. 5 is a block diagram showing the functions of a print service shop.

FIG. 5 is a functional block diagram of a shop system constituted of a printer 101a and PC installed at a print service shop of the embodiments.

A print service shop system 101 is mainly constituted of: a communication controller 501; an information provider 502; a job accepter 503; a job processor 504; a data converter 505; an operation manager 506; a result informer 507; a fee collector 508; and a printer 509, as well as a verification information unit 551; a contract information unit 552; a fee system unit 553; a log information unit 554; a job unit 555; and a document information unit 556, respectively constituting a data management apparatus group. Each unit such as a PC including each constituent element excepting the printer 509 constitutes a shop service management unit.

The communication controller 501 performs a data communication process for the user terminal 102, print service server 100 and the like.

A user verification process and the like are performed also by the communication controller 501 when a user terminal is connected directly to the print service shop system 101. Data of a particular user having a high use frequency is transferred from the print service server to the verification information unit 551 of this system so that the system can directly perform the verification process by using the transferred data. However, in a usual case, the verification process is performed by the print service server.

The information provider 502 searches requested data from various data managed by this system and generates data to be sent back to the requester.

The job accepter 503 accepts job data (mainly print request) directly from a user or from the print service server, the job data being managed by the job unit 555.

The job accepter 503 also accepts a request for registering a document registration in this system from a user, data regarding the document registration request being managed by the document information unit 556.

The job distributer 504 sequentially transfers job data still not processed and under management by the job unit 555 to the printer 509 to execute the job, and in accordance with the job execution result, the job management data in the job unit 555 is updated and registered in the log information unit 554.

The data converter 505 performs a conversion process of converting, when necessary, the data format of job data or the like so as to match the print process performance of this system.

The operation manager 506 performs registration, update and the like of fee management data and the like necessary for providing and operating services for the data management apparatus group.

The result informer 507 notifies the print service server of a result of the executed job. The result informer 507 constitutes a history information notifying means.

A fee collector 508 is used for the system to collect a charge amount to be claimed for the job result by means of cash, prepaid card or the like.

The printer 509 has not only a monochromatic image and color image printing function and a both-side printing function but also an additional service function such as a binding function. The printer 509 corresponds to the printer 101a.

The data management apparatus group operated and managed by this system will be described supplementarily.

The verification information unit 551 is similar to that of the print service server in terms of function. However, the print service shop system can manage data of only a particular fixed user under contract.

The contract information unit 552 manages various contract contents, operation condition data and the like respectively of fixed users.

The fee system unit 553 manages data such as charge service conditions specific to the shop, the data being stored also as the shop information of the print service server.

The log information unit 554 sequentially records and manages as to who issued a job to which shop and what was the result, and the like, respectively of the service supplied at the shop.

The job unit 555 manages a job received from a user to sequentially perform a job process.

The job unit 555 stores a priority degree of each job to perform job scheduling, accepts a job with a designated execution time, and stores job data to be later executed again.

The document information unit 556 can perform registration, management, search and the like of a document upon request from a user.

(Fundamental Process Flow of Print Service)

Figure 6:
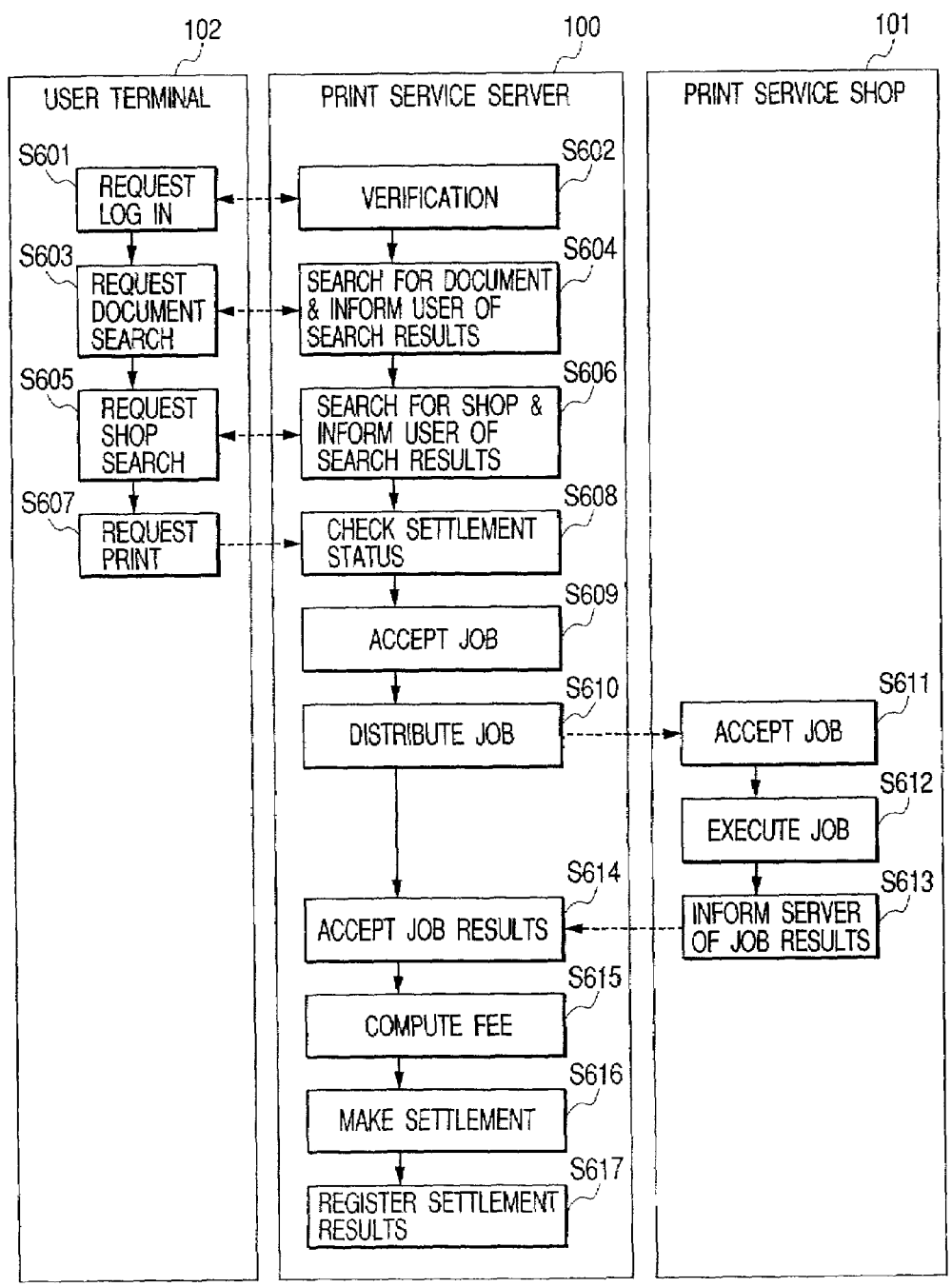
FIG. 6 is a diagram showing a print service sequence when a user terminal accesses a print service server.
Figure 7:
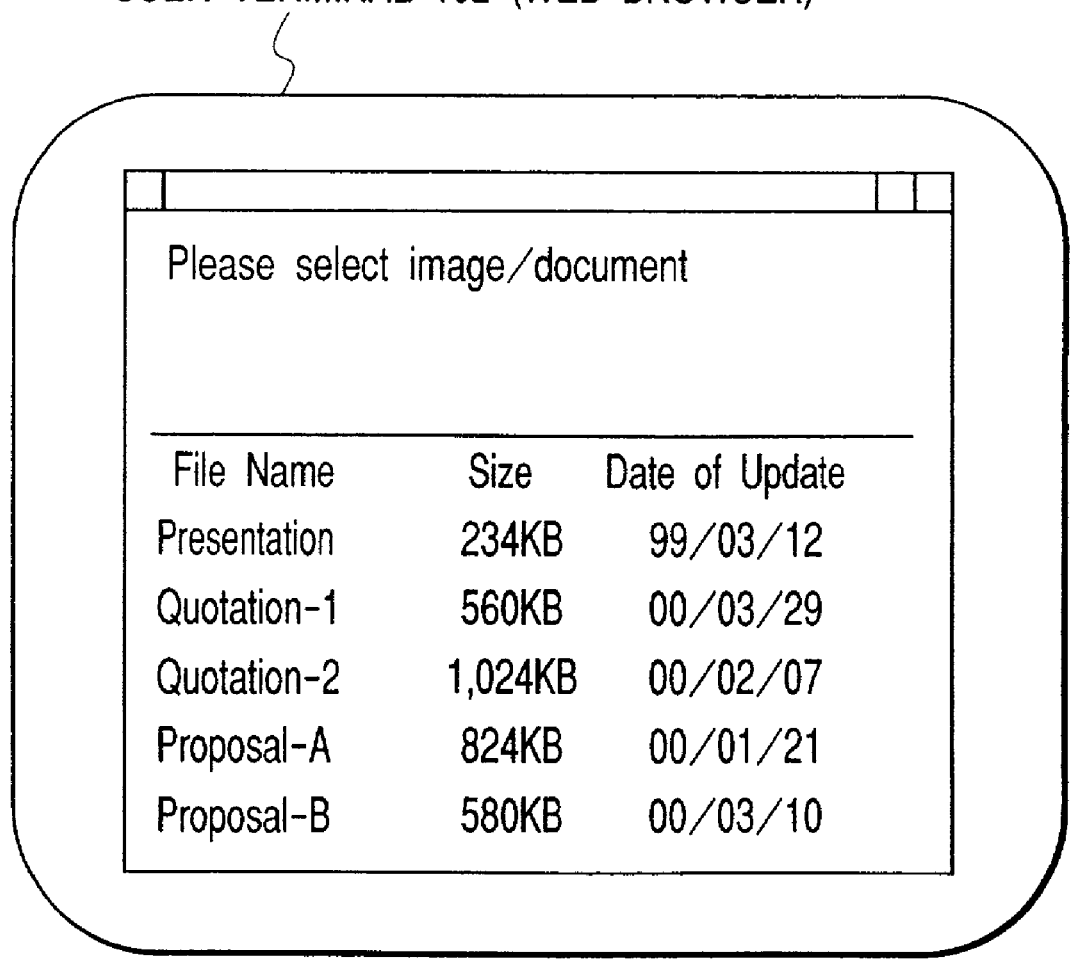
FIG. 7 shows an example of a display window on a user terminal.

FIG. 6 is a diagram showing an example of a print service sequence according to the embodiment, and FIG. 7 shows an example of a display window on a user terminal.

FIG. 6 is a diagram showing the print service sequence when a user terminal 102 accesses the print service server 100 and asks the print service shop 101 for printing. The fundamental process flow will be described.

When the user terminal 102 issues a login request to the print service server 100 (S601), the server 100 performs a verification process (S602) and notifies an access permission or inhibition.

Next, if a search request for a document stored in advance in the server 100 is issued (S603), the server 100 performs a requested document search process and notifies the search result (S604).

When a search request for available shop information is issued (S605), the server 100 performs a process of searching shop information from the shop information under management, in accordance with the requested search conditions, and notifies the search result (S606).

A user designates, if necessary, a document to be printed, a shop, print conditions supported by the print service shop, and the user terminal 102 transmits a print request to the print service server 100 (S607). The server 100 first confirms whether there is any problem of the user settlement status (S608), and then accepts the request (S609).

FIG. 7 shows an example of a display window on the user terminal. The user terminal 102 displays a search result list of documents registered in advance by the user in the print service server 100, and the user selects and identifies the document to be printed.

When a print requested job is distributed to a predetermined shop (S610), the shop 101 accepts the job (S611).

After the job is processed (S612), the job result is notified to the server 101 (S613).

After the server 100 accepts the job result (S614), the server 100 executes a fee computation process (S615) to make settlement (S616), and the settlement data is registered in the log (S617).

Figure 8:
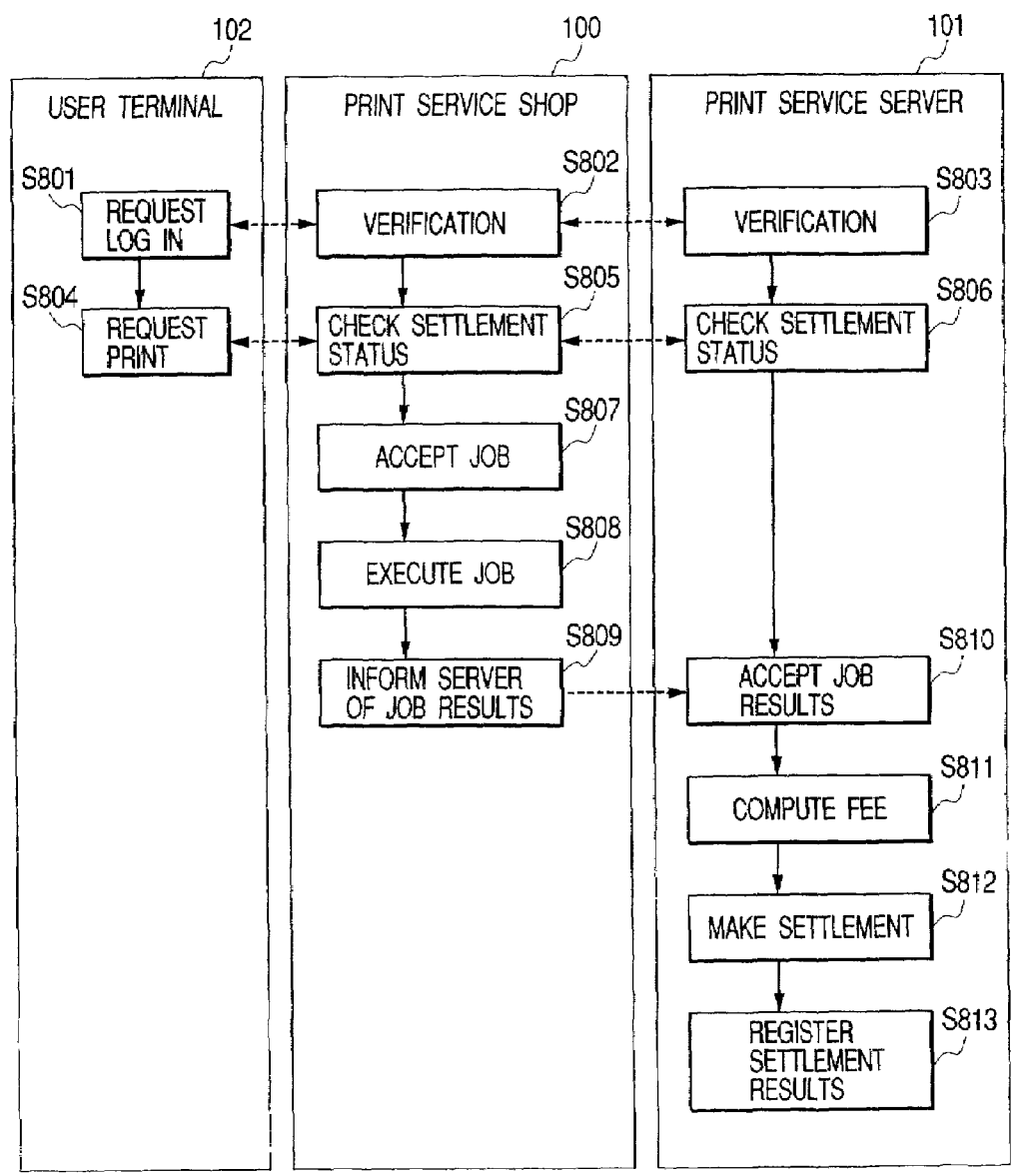
FIG. 8 is a diagram showing a print service sequence when a user terminal directly accesses a printer at a print service shop.

FIG. 8 is a diagram showing a sequence when the user terminal 102 directly accesses the print service shop 101 and processes the print request in cooperation with the print service server 100. The fundamental process flow will be described. This sequence is applied, for example, to the case wherein a user with the user terminal 102 visits the service shop and connects the user terminal 102 to the printer 110a and PC of the print service shop.

When the user terminal 102 issues a login request to the print service shop system 101 (S801), the print service shop system 101 performs a verification process (S802) to notify a print permission or inhibition. In this case, the print service server 100 may be asked for the verification process if necessary (S803).

When the user terminal 102 issues a document print request by designating, if necessary, print conditions supported by the print service shop system 101 (S804), the shop system 101 confirms whether there is any problem of a user settlement status (S805), and then accepts the document print request (S807). At this time, the user terminal 102 transmits print data (document data) to be printed as well as the document print request to the printer 101a. If necessary, the server 102 is asked for the settlement status to perform the confirmation process (S806).

If the document is registered beforehand in the print service shop system 101, the document is searched and designated to print it out.

After the job is processed (S808), the job result is notified to the server 100 (S809) which receives the job result (S810) and executes a fee computation process (S811) and then a settlement process (S812). The settlement data is registered in the log (S813).

(Charge Management Attribute Update Process Depending Upon User Use Records)

Figure 9:
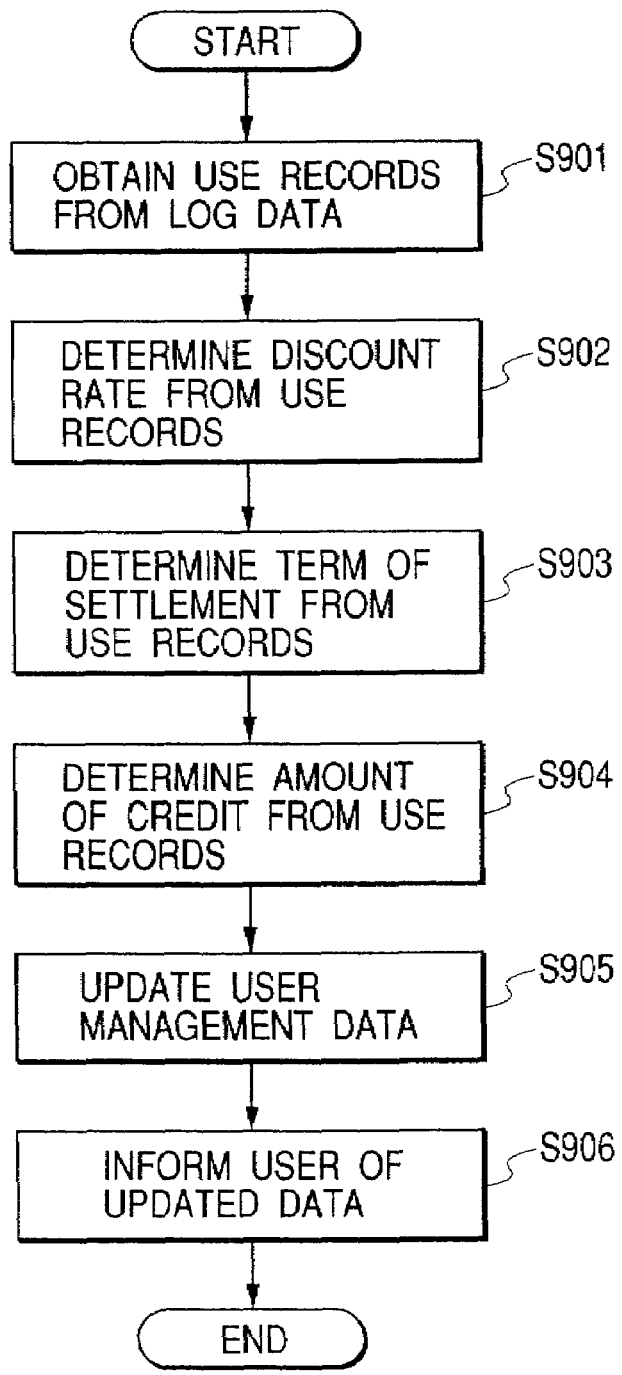
FIG. 9 is a flow chart illustrating the outline of a process of updating a user charge management attribute.

Means for providing various services depending upon user use records will be described, which means is used for promoting use of services and is characteristic to the present invention. FIG. 9 is a flow chart illustrating the outline of a process of updating various user charge management attributes (such as a discount rate of a base fee) in accordance with user use records.

First, user use records are acquired from log data (S901). FIG. 10 shows an example of log data managed by the log information unit 454. FIG. 10 shows use records as of March 2000, with a user ID, a date of use, and a fee.

FIG. 11 shows a service use record management table before log data managed by the contract information unit 452 is acquired. Since the use records of March are not recorded in the table shown in FIG. 11, log data shown in FIG. 10 is the use records of March. Namely, a use fee of Okuda in March is 2,450 Yen and a use fee of Yamada in March is 12,100 Yen.

Next, a discount rate of a use fee is determined from the acquired data and the contents of the user charge management attribute reference table managed by the fee system unit 453 (S902).

A user having larger use records is provided with more discount services.

FIG. 12 shows an example of the user charge management attribute reference table managed by the fee system unit 453. In this example, the table is used for determining a base discount rate, a term of settlement, a credit accepted and the like from use records of the previous month. Use records may be managed in the unit of three months, half year or the like.

In the example of the log data shown in FIG. 10, a base discount rate of Okuda is 1% and that of Yamada is 5% according to the use records of March.

Similarly, the term of settlement of each user is determined (S903).

It is judged that a user having larger use records has more credit. The user is set with a longer settlement term and provided with service of reducing the number of settlement times.

In the example of the log data shown in FIG. 10, a settlement term of Okuda is one day and that of Yamada is seven days according to the use records of March.

Similarly, the credit accepted of each user is determined (S904).

It is judged that a user having larger use records has more credit. The user is set with a higher upper limit credit accepted and provided with service of reducing the number of settlement times.

In the example of the log data shown in FIG. 10, an upper limit credit accepted of Okuda is 1,000 Yen and that of Yamada is 10,000 Yen according to the use records of March.

Next, in accordance with the data such as fee and settlement conditions of each user determined as above, the data such as fee and settlement conditions of each user in the service use record management table managed by the contract information unit 452 is updated (S905).

FIG. 13 shows an example of the service use record management table updated in accordance with the use records of March.

Figure 14:
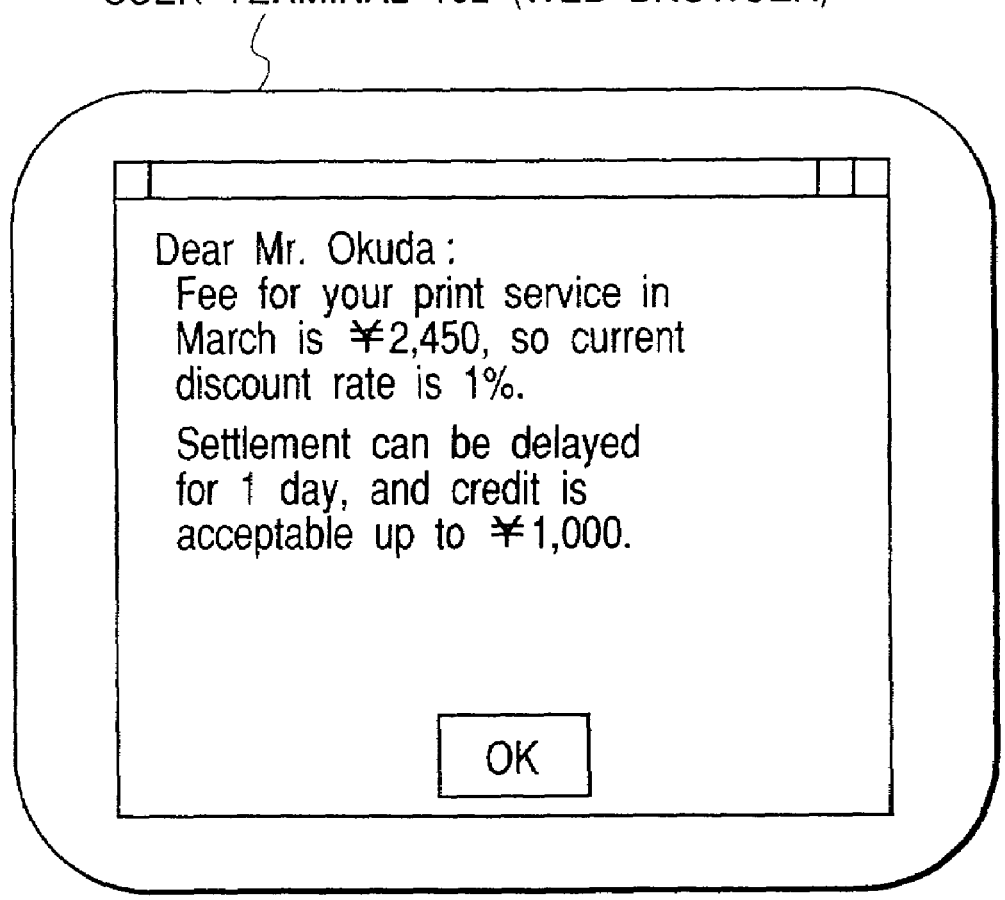
FIG. 14 shows an example of a display window on a user terminal.

When the data of each user is changed, this effect is notified to the user (S906). A notifying means may be any means. An example of a display window on the user terminal 102 is shown in FIG. 14.

The series of processes described above may be performed periodically or automatically when the amount of use records reaches a predetermined amount, by setting the operation manager 506.

(Contracted Shop Royalty Update Process Depending Upon Use Records)

Next, means for providing service of reducing a royalty depending upon use records will be described, which means is used for expanding print service sites and promoting affiliation of print service shops.

Figure 15:
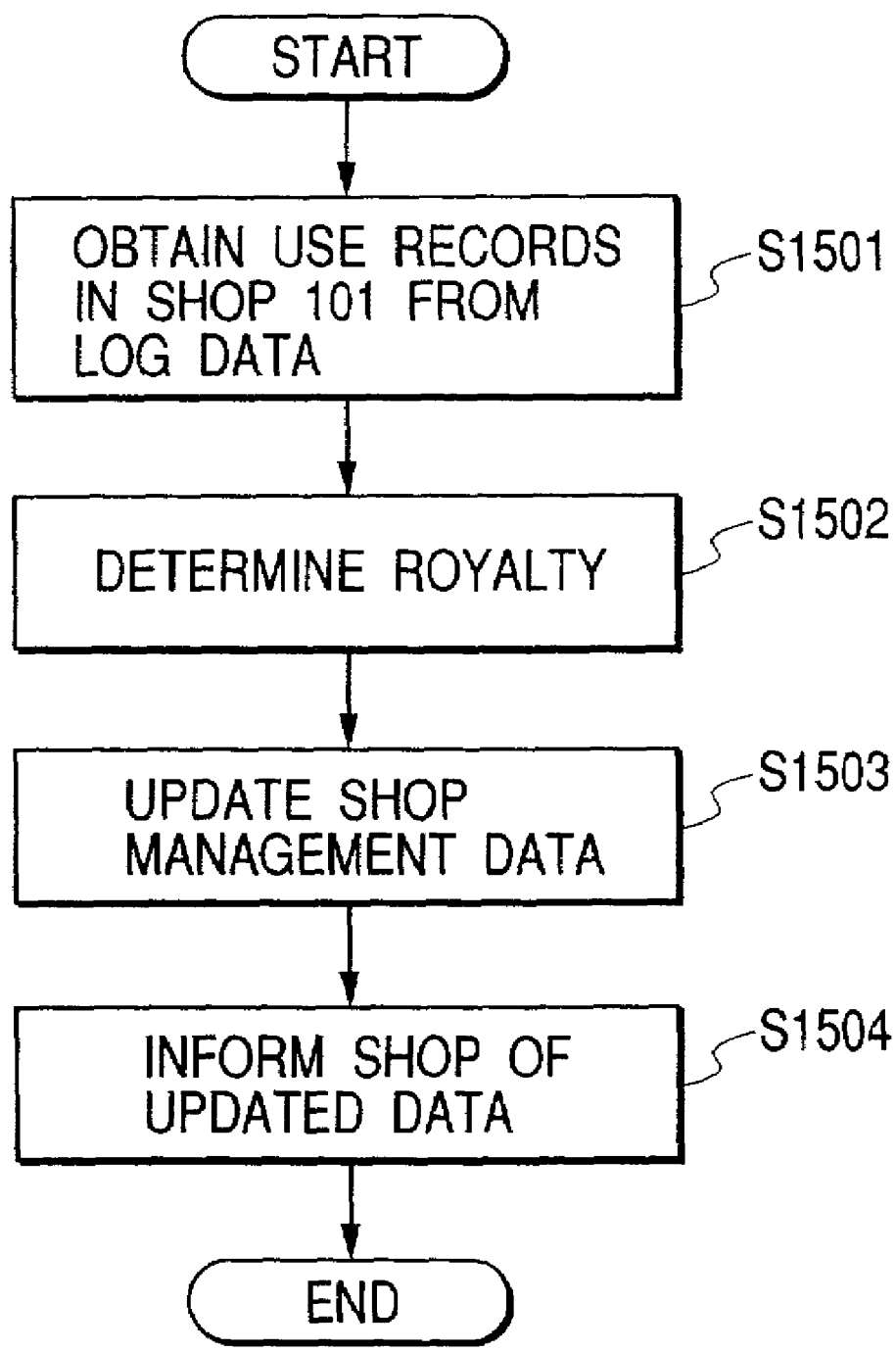
FIG. 15 is a flow chart illustrating a royalty updating process for a print service shop.

FIG. 15 is a flow chart illustrating a process of updating a royalty of a contracted shop.

First, use records of the print service shop 101 are acquired from log data (S1501). FIG. 16 shows an example of log data managed by the log information unit 454. FIG. 16 shows use records as of March 2000, with a shop ID of a print service shop, a date of use, and an operation (use) fee. FIG. 17 shows a printer use record management table of each shop managed by the shop information unit 458. Data in the table of FIG. 17 is the data before log data is acquired. Total records of the shop having a shop ID "0001" is 158,000 Yen and its royalty is 4.5%, and total records of the shop having a shop ID "0002" is 64,850 Yen and its royalty is 10.0%.

Next, a royalty of a contracted shop is determined from the acquired data and the contents of a contacted shop royalty reference table managed by the fee system unit (S1502).

More discount service of a royalty is provided to a shop having larger operation records. FIG. 18 is an example of the contracted shop royalty reference table.

The table is used for determining a royalty basing upon total records counted from the service start. Instead, the table is preferably changed to a table suitable for service operation, for example, the table may be determined from records of each year.

Total records of the shop ID "0001" are 485,470 Yen and those of the shop ID "0002" are 136,950 Yen according to the log data shown in FIG. 16. Therefore, the royalty is 4.5% for both the shops.

Next, in accordance with the royalty data of each shop determined by the above processes, the royalty data of each shop managed by the shop information unit 458 is updated (S1503).

FIG. 19 shows an example of a printer use record management table updated in accordance with total records. Although the royalty of the shop ID "0001" remains 4.5%, the royalty of the shop ID "0002" lowers from 10.0% to 4.5%.

Figure 20:
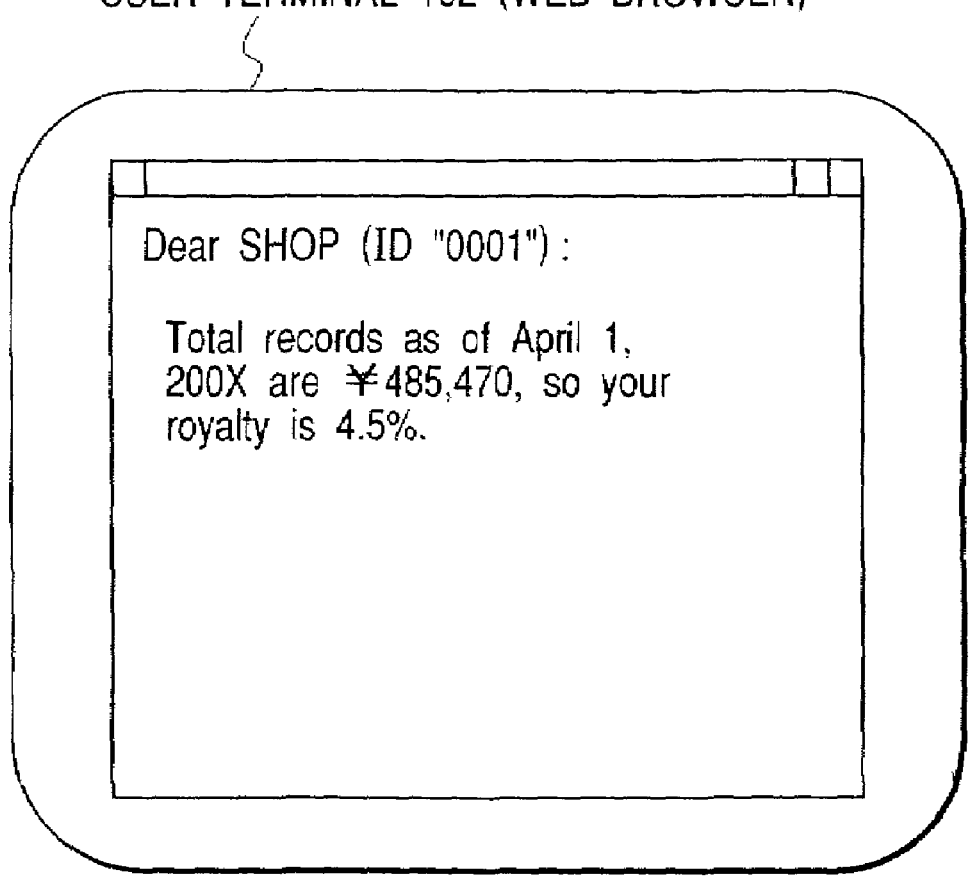
FIG. 20 shows an example of a display window on a user terminal at a print service shop.

When the printer use record management table of each print service shop is updated, this effect is notified to the shop (S1504). A notifying means may be any means. An example of a display window on the management terminal such as PC of a shop is shown in FIG. 20.

The series of processes described above may be performed periodically or automatically when the amount of operation records of each shop reaches a predetermined amount, by setting the operation manager 454.

(Shop Select Process by User)

Means for accessing the print service server 100 by a user to search a print service shop 101 and select the shop will be described.

Figure 21:
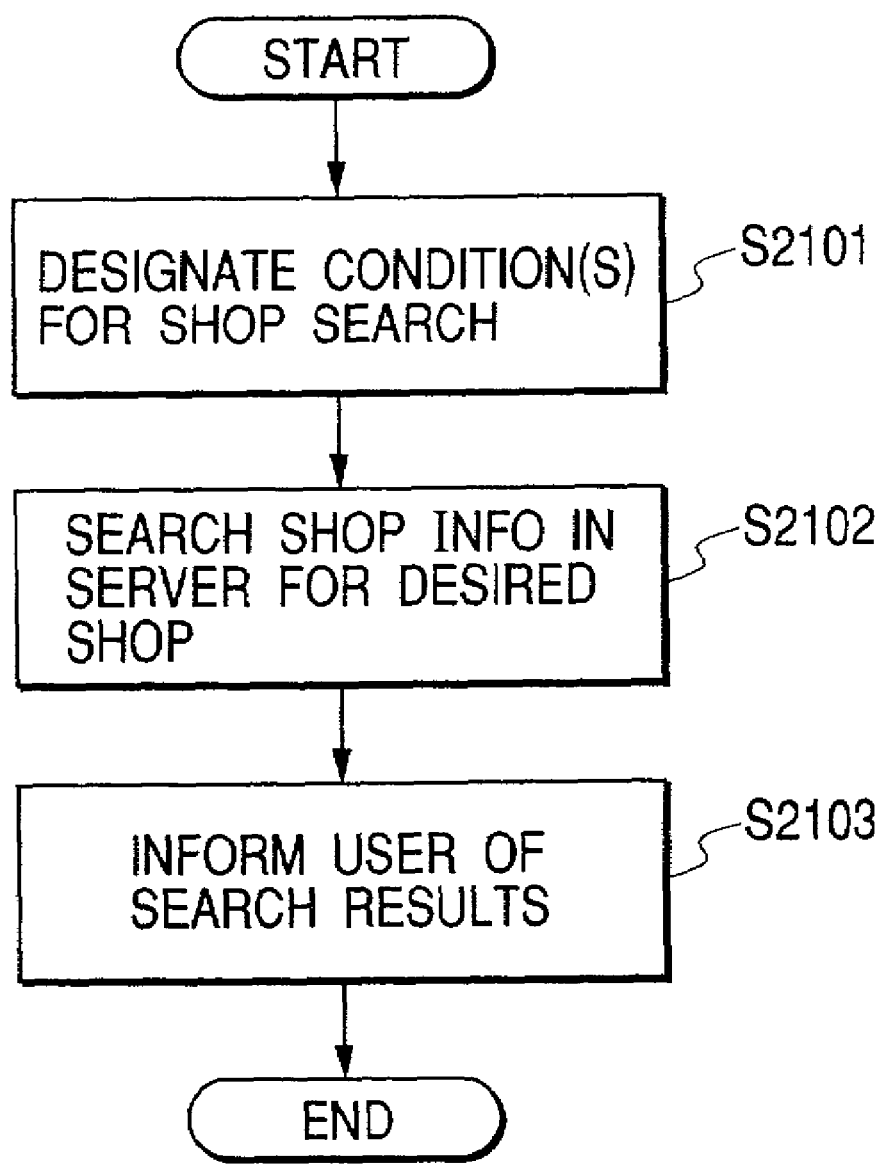
FIG. 21 is a flow chart illustrating the outline of a print service shop selection service process.

FIG. 21 is a flow chart illustrating a shop select service process.

First, shop search conditions are designated (S2101). The shop search conditions may be shop location information, shop current running status information, various discount information of each shop, or the like. The shop search conditions are not limited only to the above, but it is desired that the shop search conditions beneficial to a user are added depending upon the operation state.

Next, shop information matching the designated search conditions is acquired from the shop information registered in the print service server 100 (S2102). The shop information is updated at proper timings.

FIG. 22 shows an example of a shop information table managed by the shop information unit 458. By using the shop information table formed in accordance with the search conditions, designated shop information is derived.

In this table, shop location information, time service information and the like are managed as shop information. Other information beneficial to a user may be added. Shop information is dynamic information. Namely, this information is inquired from the server 100 to the shop 101 to notify the new information to a user.

Figure 23:
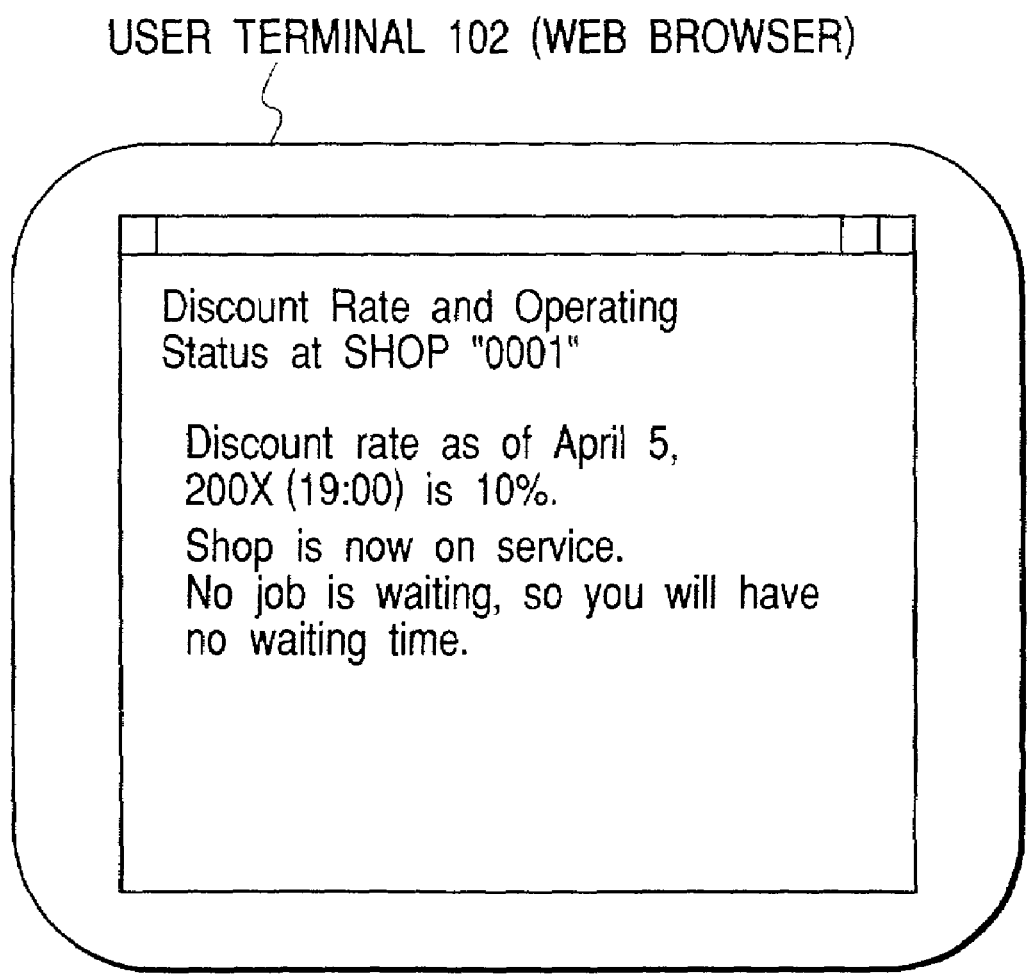
FIG. 23 shows an example of a display window on a user terminal.
Figure 24:
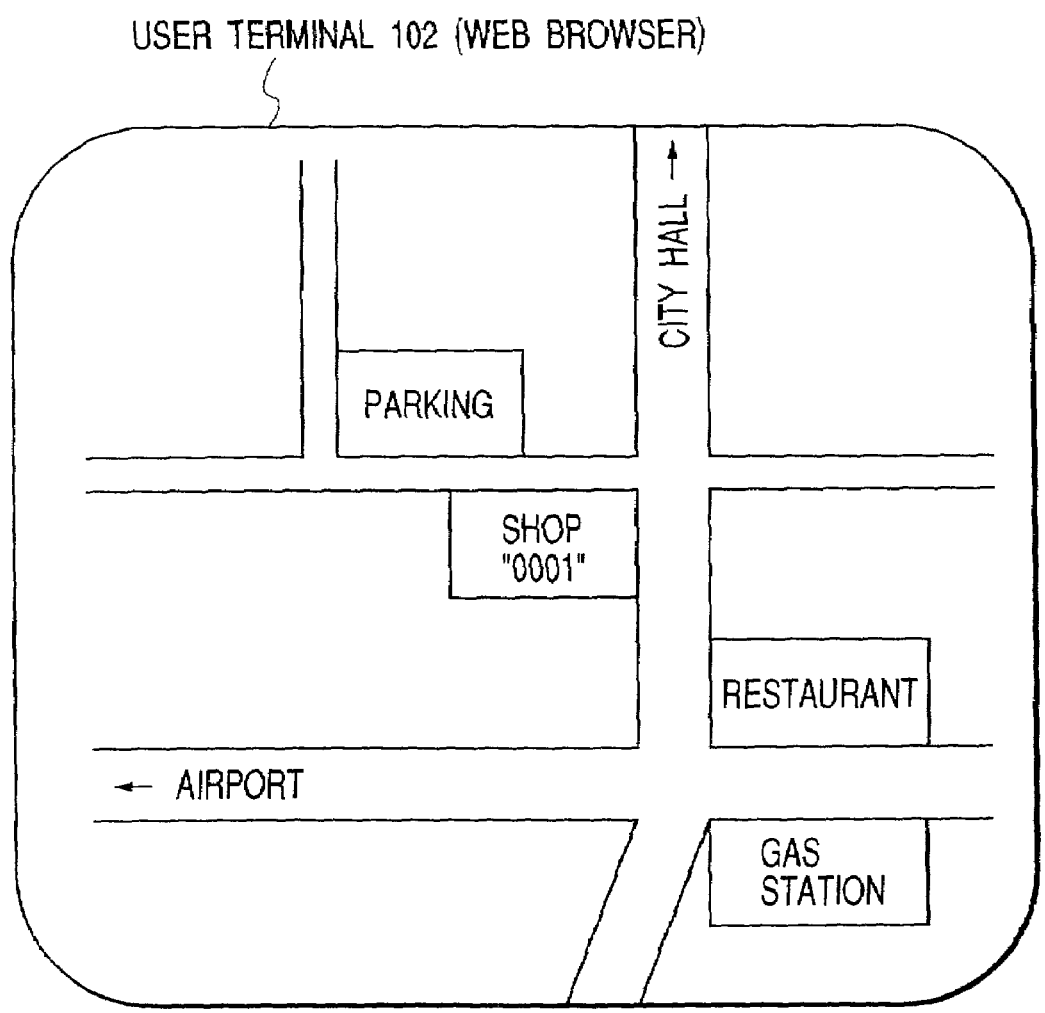
FIG. 24 shown an example of a display window on a user terminal showing the location of a shop on a map.

Shop information is notified to the user (S2103). An example of a display window on the user terminal 102 is shown in FIG. 23. As shown in FIG. 24, the location of a designated shop may be displayed on a map.

(Service Use Fee Computation Process)

Means for computing a service user fee of this embodiment will be described.

Figure 25:
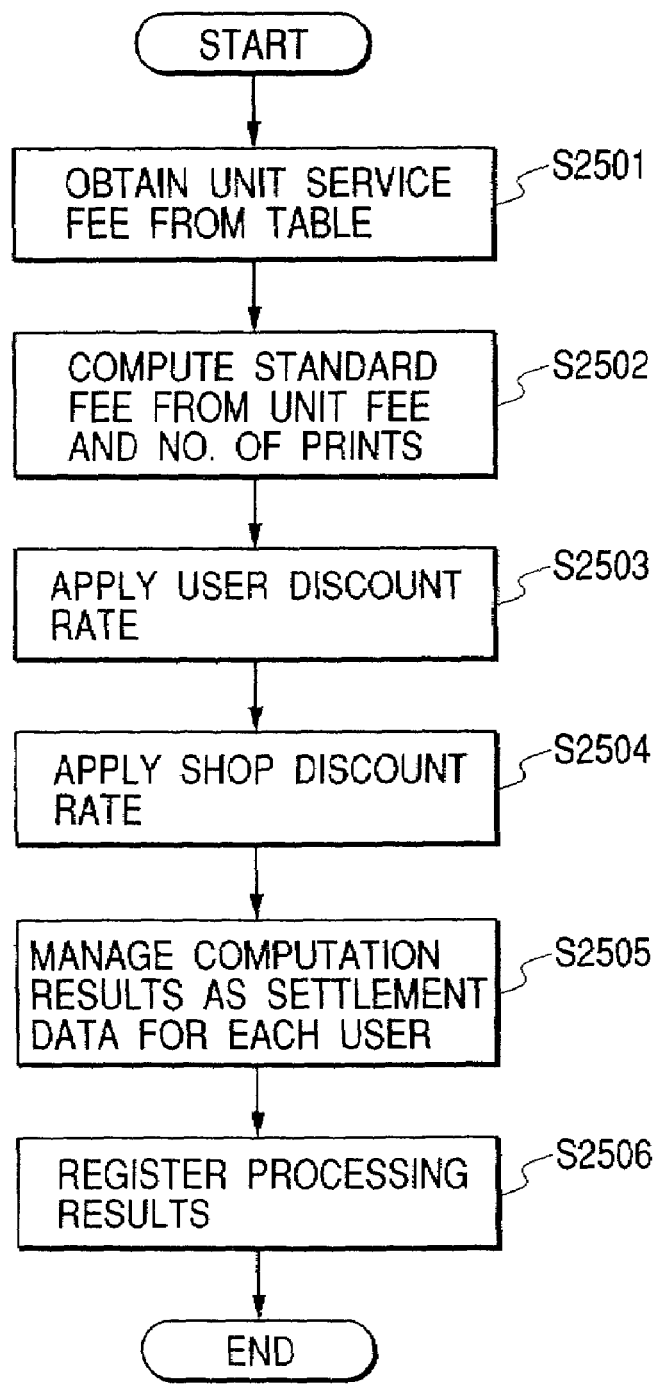
FIG. 25 is a flow chart illustrating the outline of a fee computation process.

FIG. 25 is a flow chart illustrating a fee computation process.

First, a unit service fee of a service type used by a user is acquired from a service type standard unit fee table managed by the fee system unit 453 (S2501).

The service type used by the user is acquired from log data. FIG. 26 shows an example of the structure of log data managed by the log information unit 454. Since data of the service type used by a user, such as direct and remote, is registered as the log data, it is possible to judge the service type used by the user from this log data. The log information unit 454 constitutes a print service request type management means. The fee computer 408 for executing the following computation process constitutes a print service request type judging means and a print service use fee computing means.

An example of the service type standard unit fee table is shown in FIG. 27.

The following description will be given by taking as an example a use fee of Okuda on Apr. 1, 2000 shown in FIG. 26. Okuda printed a monochromatic copy of A4 size in a direct service request mode. A standard fee per one A4 sheet is 9 Yen as shown in FIG. 27. The service type standard unit fee table corresponds to the user fee computation table and the fee system unit 453 constitutes a user fee computation table management means.

Next, a fee corresponding to a use amount (number of printed sheets or the like) is calculated from the acquired unit fee (S2502).

In the example shown in FIG. 26, Okuda printed out ten sheets so that 9×10=90 Yen.

Next, a discount rate managed by the contract information unit 452 for each user is acquired and a fee after discount is calculated from the obtained standard fee (S2503).

From the service use record management table shown in FIG. 12, the discount rate applied to Okuda is 1% so that 90×0.99=89.1 Yen.

Next, if a discount service at the shop can be applied, a predetermined discount rate is acquired from the shop information unit 458 to calculate again the fee (S2504).

It is assumed in the above example that Okuda used the shop having the shop ID "0001". Since the use time is the midnight, the discount rate is 30% as shown in the shop discount column of FIG. 22. Therefore, the fee calculated again is 89.1 Yen×0.7=62.37 Yen which is rounded off to obtain a final fee of 63 Yen.

The discount rate in the shop discount column of the shop information shown in FIG. 22 varies with the operation status of the printer at each shop and with operation records at each shop.

The discounted fee at each shop is automatically claimed to the shop in another process.

The calculated data is managed as settlement data of each user and settlement is made in another process (S2505).

The result of the above-described processes is registered in the log (S2506). The registered log can be managed as service records.

In the above example, two types of service modes are prepared including a direct service request mode from the shop system and a remote service request via the print service server. In each mode, a standard fee and the like for a monochromatic print and a color print of each recording sheet size are set and managed. Instead, the unit service fee may be set and managed flexibly. The remote print fee is higher than the other service because it contains a communication fee.

(Settlement Related Process)

A settlement related process by the settlement maker 409 will be described.

Figure 28:
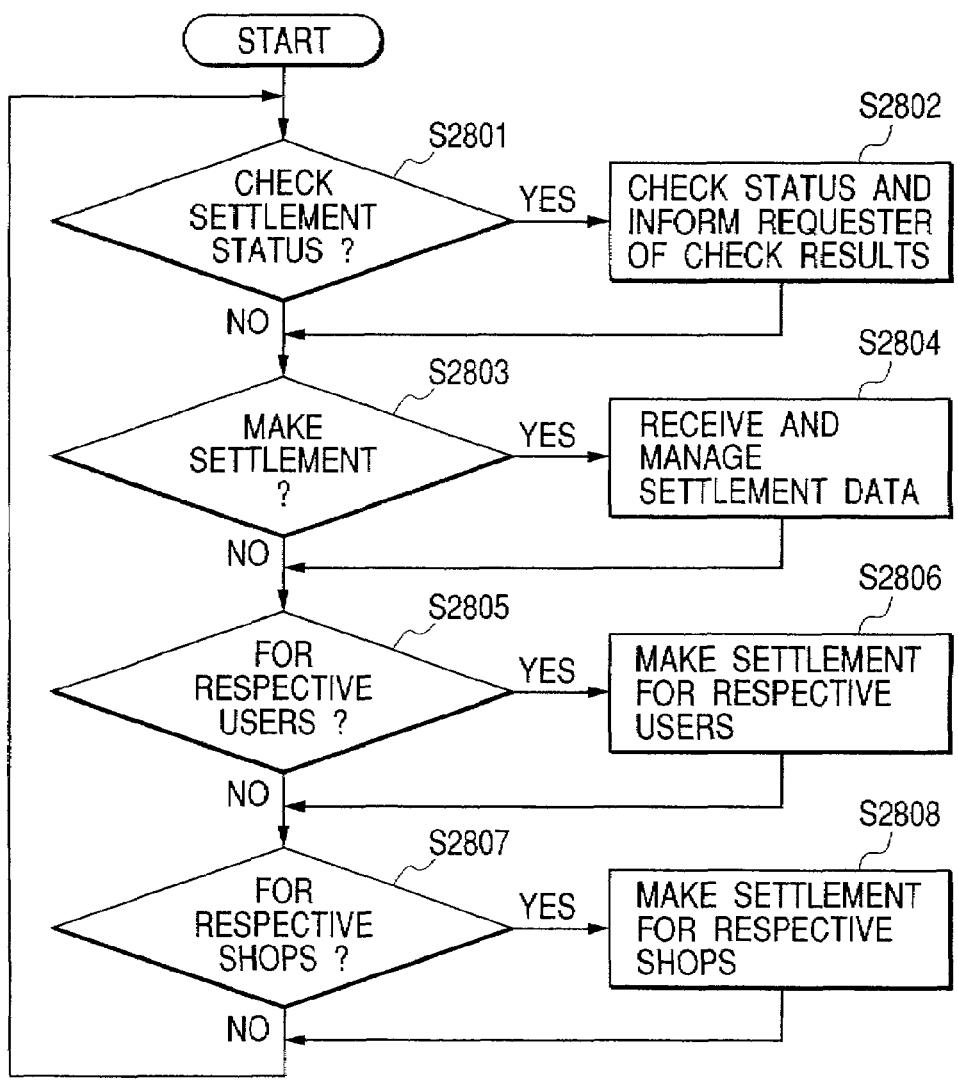
FIG. 28 is a flow chart illustrating the outline of a settlement process.

FIG. 28 is a flow chart illustrating a settlement process.

When a settlement status confirmation request is received (S2801), a settlement status of the user, particularly, presence/absence of arrears, unsettled amount and the like, managed by the settlement information unit 457 are acquired and notified to the requester (S2802).

When a settlement process request is received (S2803), settlement data is received and managed by the settlement information unit 457 (S2804).

When a settlement process request of each user is received (S2805), a settlement day, a credit accepted and the like of each user managed by the contract information unit 452 are checked and a process corresponding to a preregistered settlement means (credit card, bank transfer or the like) is executed (S2806). This settlement process request is called periodically from the operation manager 406.

When a settlement process request of each shop is received (S2807), by using information managed by the shop information unit 458, a settlement process based upon service records of each shop, a settlement process based upon royalty, a settlement process for user discount service and other processes are executed (S2808). This request is periodically called from the operation manager 406.

The processes to be executed by the print service system of the invention have been described above. The user charge management attribute update process, royalty update process of each contracted shop, service use fee computation process, settlement related process are not always required to be executed by computers interconnected by a network, but they may be executed manually by using a managing means such as books.

As described so far, according to the invention, a user is provided with a credit accepted so that it is convenient for the user to use the print service system.

Furthermore, as described above, according to the invention, a use fee is set in accordance with user use records and a user routinely using the system can use service at a low fee, and a print service shop can have routine users reliably.

What is claimed is:

1. A print system which provides a print service for printing an electronic document in response to a print request that includes designation of the electronic document to be printed, said print system comprising:
    an accepting unit, adapted to accept a print job request, and
    a computing unit, adapted to compute a use fee for the print service,
    wherein, if the print job request is accepted via a server apparatus, said computing unit computes the use fee for the print service on the basis of a first billing rate, and
    if the print job request is accepted directly by a printer, said computing unit computes the use fee for the print service on the basis of a second billing rate, wherein the first billing rate differs from the second billing rate.

2. A print system according to claim 1, wherein image data is transferred via a network from the server apparatus to the printer.

3. A print system according to claim 1, wherein the server apparatus transmits registered image data to the printer in response to the print job request from a client.

4. A print system according to claim 1, wherein the server apparatus has a function of managing the print service and the server apparatus includes said computing unit.

5. A print system according to claim 1, wherein said computing unit computes the use fee in accordance with a print result notice from the printer.

6. A print system according to claim 1, wherein the server apparatus is connected to a client apparatus and the printer via a network.

7. A control method for a print system which provides a print service for printing an electronic document in response to a print request that includes designation of the electronic document to be printed, said method comprising:
    an accepting step of accepting a print job request; and
    a computing step of computing a use fee for the print service,
    wherein, if the print job request is accepted via a server apparatus in said accepting step, said computing step computes the use fee for the print service on the basis of a first billing rate, and
    if the print job request is accepted directly by a printer in said accepting step, said computing step computes the use fee for the print service on the basis of a second billing rate, wherein the first billing rate differs from the second billing rate.

8. A control method according to claim 7, wherein image data is transferred via a network from the server apparatus to the printer.

9. A control method according to claim 7, wherein the server apparatus transmits registered image data to the printer in response to the print job request from a client.

10. A control method according to claim 7, wherein the server apparatus has a function of managing the print service and the server apparatus includes a computing unit for executing said computing step.

11. A control method according to claim 7, wherein said computing step computes the use fee in accordance with a print result notice from the printer.

12. A control method according to clams 7, wherein the server apparatus is connected to a client apparatus and the printer via a network.

13. A server apparatus which provides a print service for printing an electronic document in response to a print request that includes designation of the electronic document to be printed, said apparatus comprising:
    an accepting unit, adapted to accept a print job request; and
    a computing unit, adapted to compute a use fee for the print service,
    wherein, if the print job request is accepted via a server apparatus, said computing unit computes the use fee for the print service on the basis of a first billing rate, and
    if the print job request is accepted directly by a printer, said computing unit computes the use fee for the print service on the basis of a second billing rate, wherein the first billing rate differs from the second billing rate.

14. A server apparatus according to claim 13, wherein image data is transferred via a network from said server apparatus to the printer.

15. A server apparatus according to claim 13, wherein said server apparatus transmits registered image data to the printer in response to the print job request from a client.

16. A server apparatus according to claim 13, wherein said server apparatus has a function of managing the print service.

17. A server apparatus according to claim 13, wherein said computing unit computes the use fee in accordance with a print result notice from the printer.

18. A server apparatus according to claim 13, wherein said server apparatus is connected to a client apparatus and the printer via a network.

19. A computer-readable storage medium on which is stored a computer-executable program to execute a control method for a print system which provides a print service for printing an electronic document in response to a print request that includes designation of the electronic document to be printed, said program comprising:
   an accepting step of accepting a print job request; and
   a computing step of computing a use fee for the print service,
   wherein, if the print job request is accepted via a server apparatus in said accepting step, said computing step computes the use fee for the print service on the basis of a first billing rate, and
   if the print job request is accepted directly by a printer in said accepting step, said computing step computes the use fee for the print service on the basis of a second billing rate, wherein the first billing rate differs from the second billing rate.

20. A computer-readable storage medium according to claim 19, wherein image data is transferred via a network from the server apparatus to the printer.

21. A computer-readable storage medium according to claim 19, wherein the server apparatus transmits registered image data to the printer in response to the print job request from a client.

22. A computer-readable storage medium according to claim 19, wherein the server apparatus has a function of managing the print service and the server apparatus includes a computing unit for executing said computing step.

23. A computer-readable storage medium according to claim 19, wherein said computing step computes the use fee in accordance with a print result notice train the printer.

24. A computer-readable storage medium according to claim 19, wherein the server apparatus is connected to a client apparatus and the printer via a network.

25. A program stored on a computer-readable storage medium, the program causing a computer to execute a control method for a print system which provides a print service for printing an electronic document in response to a print request tat includes designation of the electronic document to be printed, said program comprising:
   an accepting module for accepting a print job request; and
   a computing module for computing a use fee for the print service,
   wherein, if the print job request is accepted via a server apparatus by said accepting module, said computing module computes the use fee for the print service on the basis of a first billing rate, and
   if the print job request is accepted directly by a printer by said accepting module, said computing module computes the use fee for the print service on the basis of a second billing rate, wherein the first billing rate differs from the second billing rate.

26. A program according to claim 25, wherein image data is transferred via a network from the server apparatus to the printer.

27. A program according to claim 25, wherein the server apparatus transmits registered image data to the printer in response to the print job request from a client.

28. A program according to claim 25, wherein the server apparatus has a function of managing the print service and the server apparatus includes a computing unit for executing said computing module.

29. A program according to claim 25, wherein said computing module computes the use fee in accordance with a print result notice from the printer.

30. A program according to claim 25, wherein the server apparatus is connected to a client apparatus and the printer via a network.

31. A print system which provides a print service for printing an electronic document in response to a print request that includes designation of the electronic document to be printed, said print system comprising:
   a managing unit, adapted to manage user identification information for identifying a user requesting the print service and use information on use results of the print service used by the user, wherein the user information and the use information are related to each other;
   a determination unit, adapted to dynamically determine a discount rate of a billing rate for the print service on the basis of the use information managed by said managing means unit on use results of the print service used by the user; and
   a computing unit, adapted to compute a settlement amount for the print service in accordance with the discount rate determined by said determination unit.

32. A print system according to claim 31, further comprising:
   a discount information managing unit, adapted to manage discount information on the discount rate of the billing rate for the print service to be applied to the user; and
   a notifying unit, adapted to notify the user that the discount information on the discount rate of the billing rate for the print service was updated,
   wherein said discount information managing unit updates the discount information in accordance with the use information on the use results for the print service used by the user, and
   said notifying unit notifies the user that the discount information was updated.

33. A print system according to claim 31, wherein said managing unit includes a management table storing the user identification information for identifying the user and the use information on the use results for the print service used by the user, with both the user identification information and the use information being related to each other, and updates the management table for the user in accordance with use of the print service by the user.

34. A print system according to claim 33, further comprising a notifying unit, adapted to notify the user that the management table was updated,
   wherein said managing unit updates the management table for the user in accordance with use of the print service by the user, and
   said notifying unit notifies the user that the management table was updated.

35. A print system according to claim 31, further comprising a condition determining unit, adapted to determine a charge condition applied to the user, in accordance with the use information on the use results for the print service used by the user.

36. A print system according to claim 31, further comprising:

a condition managing unit, adapted to manage user identification information for identifying the user and charge condition information on a charge condition applied to the user, wherein both the user identification information and the charge condition information are related to each other; and a notifying unit, adapted to notify the user that the charge condition applied to the user was updated, wherein said condition managing unit updates the charge condition information applied to the user in accordance with use of the print service by the user, and said notifying unit notifies the user that the charge condition applied to the user was updated.

37. A control method for a print system which provides a print service for printing an electronic document in response to a print request that includes designation of the electronic document to be printed, said method comprising:

a managing step of managing user identification information for identifying a user requesting the print service and use information on use results of the print service used by the user, wherein the user identification information and the use information are related to each other;

a determination step of dynamically determining a discount rate of a billing rate for the print service on the basis of the use information managed in the managing step on the use results of the print service used by the user; and a computing step of computing a settlement amount for the print service in accordance with the discount rate determined in said determination step.

38. A control method according to claim 37, further comprising:

a discount information managing step of managing discount information on the discount rate of the billing rate for the print service to be applied to the user; and a notifying step of notifying the user that the discount information on the discount rate of the billing rate for the print service was updated, wherein said discount information managing step updates the discount information in accordance with the use information on the use results forte print service used by the user, and said notifying step notifies the user that the discount information was updated.

39. A control method according to claim 37, wherein, in said managing step, a management table is used to store the user identification information for identifying the user and the use information on the use results for the print service used by the user, wit both the user identification information and the use information being related to each other, and said managing step updates the management table for the user in accordance with use of the print service by the user.

40. A control method according to claim 39, further comprising a notifying step of notifying the user that the management table was updated, wherein said managing step updates the management table for the user in accordance with use of the print service by the user, and said notifying step notifies the user that the management table was updated.

41. A control method according to claim 37, further comprising a condition determining step of determining a charge condition applied to the user, in accordance wit the use information on the use results for the print service used by the user.

42. A control method according to claim 37, further comprising:

a condition managing step of managing the user identification information for identifying the user and charge condition information on a charge condition applied to the user, wherein both the user identification information and the charge condition information are related to each other; and a notifying step of notifying the user that the charge condition applied to the user was updated, wherein said condition managing step updates the charge condition information applied to the user in accordance with use of the print service by the user, and said notifying step notifies the user tat the charge condition applied to the user was updated.

43. A server apparatus which provides a print service for printing an electronic document in response to a print request that includes designation of the electronic document to be printed, said apparatus comprising:

a managing unit, adapted to manage user identification information for identifying a user requesting the print service and use information on use results of the print service used by the user, wherein the user identification information and the use information are related to each other;

a determination unit, adapted to dynamically determine a discount rate of a billing rate for the print service on the basis of the use information managed by the managing unit on use results for the print service used by the user; and a computing unit, adapted to compute a settlement amount for the print service in accordance with the discount rate determined by said determination unit.

44. A server apparatus according to claim 43, further comprising:

a discount information managing unit, adapted to manage discount information on the discount rate of the billing rate for the print service to be applied to the user, and a notifying unit, adapted to notify the user that the discount information on the discount rate of the billing rate for the print service was updated, wherein said discount information managing unit updates the discount information in accordance with the use information on the use results for the print service used by the user, and said notifying unit notifies the user that the discount information was updated.

45. A server apparatus according to claim 43, wherein said managing unit includes a management table storing the user identification information for identifying the user and the use information on the use results for the print service used by the user, with both of the user identification information and the use information being related to each other, and updates the management table for the user in accordance wit use of the print service by the user.

46. A server apparatus according to claim 45, further comprising a notifying unit, adapted to notify the user that the management table was updated, wherein said managing unit updates the management table for the user in accordance with use of the print service by the user, and said notifying unit notifies the user that the management table was updated.

47. A server apparatus according to claim 43, further comprising a condition determining unit, adapted to determine a charge condition applied to the user, in accordance with the use information on the use results for the print service used by the user.

48. A server apparatus according to claim 43, further comprising:
a condition managing unit, adapted to manage user identification information for identifying the user and charge condition information on a charge condition applied to the user, wherein both the user identification information and the charge condition information are related to each other; and
a notifying unit, adapted to notify the user that the charge condition applied to the user was updated,
wherein said condition managing unit updates the charge condition information applied to the user in accordance with use of the print service by the user, and said notifying unit notifies the user that the charge condition applied to the user was updated.

49. A computer-readable storage medium on which is stored a computer-executable program to execute a control method for a print system which provides a print service for printing an electronic document in response to a print request that includes designation of the electronic document to be printed, said program comprising:
a managing step of managing user identification information for identifying user requesting the print service and use information on use results of the print service used by the user, wherein the user identification information and the use information are related to each other;
a determination step of dynamically determining a discount rate of a billing rate for the print service on the basis of the use information on use results of the print service used by the user managed in said managing step; and
a computing step of computing a settlement amount for the print service in accordance with the discount rate determined in said determination step.

50. A computer-readable storage medium according to claim 49, wherein said program further comprises:
a discount information managing step of managing discount information on the discount rate of the billing rate for the print service to be applied to the user; and
a notifying step of notifying the user that the discount information on the discount rate of the billing rate for the print service was updated,
wherein said discount information managing step updates the discount information in accordance with the use information on the use results of the print service used by the user, and
said notifying step notifies the user that the discount information was updated.

51. A computer-readable storage medium according to claim 49, wherein, in said managing step, a management table is used to store the user identification information for identifying the user and the use information on the use results of the print service used by the user, with both the user identification information and the use information being related to each other, and said managing step updates the management table for the user in accordance with use of the print service by the user.

52. A computer-readable storage medium according to claim 51, wherein said program further comprises a notifying step of notifying the user that the management table was updated,
wherein said managing step updates the management table for the user in accordance with use of the print service by the user, and said notifying step notifies the user that the management table was updated.

53. A computer-readable storage medium according to claim 49, wherein said program further comprises a condition determining step of determining a charge condition applied to the user, in accordance with the use information on the use results of the print service used by the user.

54. A computer-readable storage medium according to claim 49, wherein said program further comprises:
a condition managing step of managing user identification information for identifying the user and charge condition information on a charge condition applied to the user, wherein both the user identification information and the charge condition information are related to each other; and
a notifying step of notifying the user that the charge condition applied to the user was updated,
wherein said condition managing step updates the charge condition information applied to the user in accordance with use of the print service by the user, and
said notifying step notifies the user that the charge condition applied to the user was updated.

55. A program stored on a computer-readable storage medium, the program causing a computer to execute a control method for a print system which provides a print service for printing an electronic document in response to a print request that includes designation of the electronic document to be printed, said program comprising:
a managing module for managing user identification information for identifying a user requesting the print service and use information on use results of the print service used by the user, wherein the user identification information and the use information are related to each other;
a determination module for dynamically determining a discount rate of a billing rate for the print service on the basis of the use information on use results of the print service used by the user managed by said managing module; and
a computing module for computing a settlement amount for the print service in accordance with the discount rate determined by said determination module.

56. A program according to claim 55, further comprising:
a discount information managing module for managing discount information on the discount rate of the billing rate for the print service to be applied to the user; and
a notifying module for notifying the user that the discount information on the discount rate of the billing rate for the print service was updated,
wherein said discount information managing module updates the discount information in accordance with the use information on to use results of the print service used by the user, and
said notifying module notifies the user that the discount information was updated.

57. A program according to claim 55, wherein, in the process by said managing module, a management table is used to store the user identification information for identifying the user and the use information on the use results for the print service used byte user, with both of the user identification information and the use information being related to each other, and said managing module updates the management table for the user in accordance with use of the print service by the user.

58. A program according to claim 57, further comprising a notifying module for notifying the user that the management table was updated, wherein said managing module updates the management table for the user in accordance with use of the print service by the user, and said notifying module notifies the user that the management table was updated.

59. A program according to claim 55, further comprising a condition determining module for determining a charge condition applied to the user, in accordance with the use information on the use results of the print service used by the user.

60. A program according to claim 55, further comprising:

a condition managing module for managing user identification information for identifying the user and charge condition information on a charge condition applied to the user, wherein both the user identification information and the charge condition information are related to each other; and a notifying module for notifying the user that the charge condition applied to the user was updated, wherein said condition managing module updates the charge condition information applied to the user in accordance with use of the print service by the user, and said notifying module notifies the user tat the charge condition applied to the user was updated.

* * * * *

UNITED STATES PATENT AND TRADEMARK OFFICE
CERTIFICATE OF CORRECTION

PATENT NO. : 7,034,952 B2  Page 1 of 1
APPLICATION NO. : 09/836288
DATED : April 25, 2006
INVENTOR(S) : Koichi Okuda et al.

It is certified that error appears in the above-identified patent and that said Letters Patent is hereby corrected as shown below:

COLUMN 9:
Line 13, "basing" should read -- based --.

COLUMN 12:
Line 43, "claims 7," should read -- claim 7, --.

COLUMN 13:
Line 42, "train" should read -- from --; and
Line 50, "tat" should read -- that --.

COLUMN 15:
Line 42, "forte" should read -- for the --; and
Lines 50 and 65, "wit" should read -- with --.

COLUMN 16:
Line 55, "wit" should read -- with --.

COLUMN 17:
Line 26, "user" should read -- a user --.

COLUMN 18:
Line 52, "to" should read -- the --; and
Line 60, "byte" should read -- by the --.

COLUMN 20:
Line 10, "tat" should read -- that --.

Signed and Sealed this

Seventeenth Day of April, 2007

JON W. DUDAS
*Director of the United States Patent and Trademark Office*